(12) United States Patent
Breeden (10) Patent No.: US 10,570,026 B2
(45) Date of Patent: Feb. 25, 2020

(54) LEACHATE TREATMENT AND REDUCTION SYSTEMS AND METHODS (71) Applicant: WASTE CONNECTIONS, INC., The Woodlands, TX (US)

(72) Inventor: Nelson Breeden, Knoxville, TN (US)

(73) Assignee: Waste Connections US, Inc., The Woodlands, TX (US)

(*) Notice: Subject to any disclaimer, the term of this patent is extended or adjusted under 35 U.S.C. 154(b) by 416 days.

(21) Appl. No.: 15/261,146

(22) Filed: Sep. 9, 2016

(65) Prior Publication Data
US 2017/0190596 A1 Jul. 6, 2017

Related U.S. Application Data (60) Provisional application No. 62/217,427, filed on Sep. 11, 2015.

(51) Int. Cl.
B01D 19/00 (2006.01)
C02F 1/16 (2006.01)
C02F 1/66 (2006.01)
B01D 1/00 (2006.01)
B01D 1/16 (2006.01)
C02F 3/02 (2006.01)
B01D 1/14 (2006.01)
C02F 1/20 (2006.01)
C02F 101/16 (2006.01)
C02F 101/30 (2006.01)
C02F 103/06 (2006.01)

(52) U.S. Cl.
CPC .............. C02F 1/16 (2013.01); B01D 1/0041 (2013.01); B01D 1/0082 (2013.01); B01D 1/14 (2013.01); B01D 1/16 (2013.01); B01D 19/0047 (2013.01); C02F 1/20 (2013.01); C02F 1/66 (2013.01); C02F 3/02 (2013.01); C02F 2101/16 (2013.01); C02F 2101/30 (2013.01); C02F 2103/06 (2013.01)

(58) Field of Classification Search
None
See application file for complete search history.

(56) References Cited

U.S. PATENT DOCUMENTS

| | | | | |
|---|---|---|---|---|
| 4,169,791 A | * | 10/1979 | Johnson, Jr. ............ | C02F 1/048 159/47.3 |
| 4,579,069 A | * | 4/1986 | Gay ......................... | G21F 9/14 110/216 |
| 5,238,578 A | * | 8/1993 | Rathsack ................. | B01D 3/00 210/702 |
| 5,342,482 A | * | 8/1994 | Duesel, Jr. ............... | B01D 1/14 159/16.2 |

(Continued)

Primary Examiner — Amber R Orlando
Assistant Examiner — Phillip Y Shao
(74) Attorney, Agent, or Firm — Jones Walker LLP (57) ABSTRACT Systems and processes for treating, reducing and/or disposing of leachate created by a landfill system by aerating, spraying and/or stripping leachate in a controlled environment to promote evaporation of a water component of the leachate, to strip a portion of ammonia from the leachate and/or to promote biological decomposition of the leachate. The reduced or concentrated leachate produced by the system or process, whether liquid, solid or slurry, can be disposed of as allowed or desired at a cost benefitted by the reduced volume and/or treated condition of the leachate.

20 Claims, 6 Drawing Sheets (56) References Cited

U.S. PATENT DOCUMENTS

| | | | |
|---|---|---|---|
| 5,601,040 A | 2/1997 | McGill | |
| 5,846,815 A | 12/1998 | Wright | |
| 5,934,270 A | 8/1999 | Echols | |
| 6,428,697 B1 * | 8/2002 | Edgar | C02F 9/00 204/660 |
| 6,913,671 B2 * | 7/2005 | Bolton | B01D 1/30 159/16.2 |
| 7,141,169 B2 | 11/2006 | Koehler | |
| 7,288,190 B2 | 10/2007 | Presby | |
| 8,052,344 B2 | 11/2011 | Lacey | |
| 8,926,792 B1 | 1/2015 | Houston | |
| 9,174,865 B2 | 11/2015 | Bleggi | |
| 2003/0024686 A1 | 2/2003 | Ouellette | |

* cited by examiner

LEACHATE TREATMENT AND REDUCTION SYSTEMS AND METHODS

CROSS REFERENCE TO RELATED APPLICATIONS

This non-provisional application claims benefit of and priority to U.S. Provisional Application Ser. No. 62/217,427 filed on Sep. 11, 2015, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to waste landfill systems; and more specifically related to the treatment, reduction and/or disposal of leachate associated with waste landfill systems.

Description of the Related Art

The term "leachate" is most commonly used in the context of residential, commercial and/or industrial waste landfills. As used herein, "leachate" is any liquid that has passed through and/or around matter, such as landfill waste, and has extracted therefrom or otherwise contains soluble or suspended solids, or any other component or aspect of the matter to which it was exposed, whether suspended or dissolved. More specifically, leachates typically contain environmentally harmful substances. In the context of a waste landfill, leachate typically exists both within and without the confines of the landfill.

Leachate is created primarily by natural precipitation making its way into and through a landfill. The water percolating through the waste becomes contaminated as it contacts the landfill waste. Leachate also may be created by the natural or accelerated decomposition of certain waste materials.

In some landfills, for example older landfills and those with either no completely impermeable containment system or a compromised containment system, leachate may exit the landfill confines and invade groundwater. Thus, leachate collection and disposal systems have been developed to remove leachate from the landfill so that leachate hydraulic pressure or head is kept below a critical level for the containment system being used. All known containment systems, whether membrane, clay or a combination, have some level of leachate porosity.

Typical leachate collection systems comprise a landfill containment system, such as a liner assembly, and collection plumbing including filters, pumps and pipes. Collected leachate may be removed to a holding facility for subsequent disposal, or pumped to an on-site treatment facility.

On-site treatment typically involves pumping the leachate to a holding facility, such as a treatment tank(s), and often mixing with chemicals to modify one or more of the leachate properties, such as pH, and to coagulate and settle solids and to reduce the concentration of hazardous matter. Despite such treatments, the treated leachate is rarely of a quality to be released to the environment. Collected and/or treated leachate is typically returned to the landfill, where it will ultimately result in the formation of additional leachate that itself will require treatment and disposal.

The inventions disclosed and taught herein are directed to systems and processes for reducing the amount of leachate created by a landfill system.

BRIEF DESCRIPTION OF THE SEVERAL VIEWS OF THE DRAWINGS

The following figures form part of the disclosure of my inventions and are included to further demonstrate certain aspects of the present invention discussed in the text. The inventions may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations described as occurring in succession, in fact, may be executed substantially concurrently or the operations may be executed in the reverse order, depending upon the functionality/acts/structure involved.

I have created systems and processes for treating, reducing and/or disposing of an amount, such as volume, of leachate created by a landfill system by aerating, spraying and/or stripping leachate in a controlled environment to promote evaporation of a water component of the leachate, to strip a portion of ammonia from the leachate and/or to promote biological decomposition of the leachate. The reduced or concentrated leachate produced by the system or process, whether liquid, solid or slurry, can be disposed of as allowed or desired at a cost benefitted by the reduced volume and/or treated condition of the leachate.

One embodiment of these inventions comprises a pre-treatment station configured to remove particulate matter from the leachate and/or other materials that may prematurely clog or otherwise foul the leachate spray nozzles. The pre-treatment station may comprise media filters, cyclone filters and other devices capable of separating solid material from liquid material. The pre-treatment station may also allow skimming or removal of separate constituents, such as without limitation, hydrocarbons. Absorbent socks or booms or other separation techniques may be used for this purpose. The pre-treated leachate may be conveyed to a controlled environment, such as an enclosed or partially enclosed structure, having a plurality of spray heads from which the leachate can be sprayed. Air pressurization devices, such as one or more fans, such as ducted fans, are configured relative to the controlled enclosure to induce airflow there through of sufficient mass to maximize evaporation of water from the sprayed or misted leachate. The system may be configured based on the existing environmental conditions so that a maximum amount of water is evaporated from the leachate without entraining liquid, such as water or leachate, in the air that exits the system. Demisting mats or other "knock down" devices may be employed to remove entrained liquid from the air that exits the structure. Leachate from which water is removed falls to the bottom of the structure into a leachate retention pool. One or more aerators or micro bubblers may be employed to increase the dissolved oxygen content of the leachate in the pool and thereby foster biological decomposition of organic material in the leachate.

In some embodiments, leachate from the pool is circulated through a heat exchange system configured to transfer heat to the leachate. The heated leachate is then returned to the leachate pool for recirculation through the sprayers for further evaporation. For example, and without limitation, a heat exchange system may comprise piping, such as HDPE piping, In addition, the air that flows through the structure may be used to "strip" ammonia ($NH_3$) from the sprayed leachate and return it to the environment outside of the structure. As the leachate in the pool is concentrated through water evaporation, reduction in ammonia content and/or reduction in organic contamination, quantities of leachate can be siphoned off or removed for further treatment or disposal. For example, and not limitation, based on chemical analyses of the leachate in the pool, such as ammonia content, leachate can be removed to a holding tank where additional aeration and treatment further reduces the ammonia content.

Figure 1:
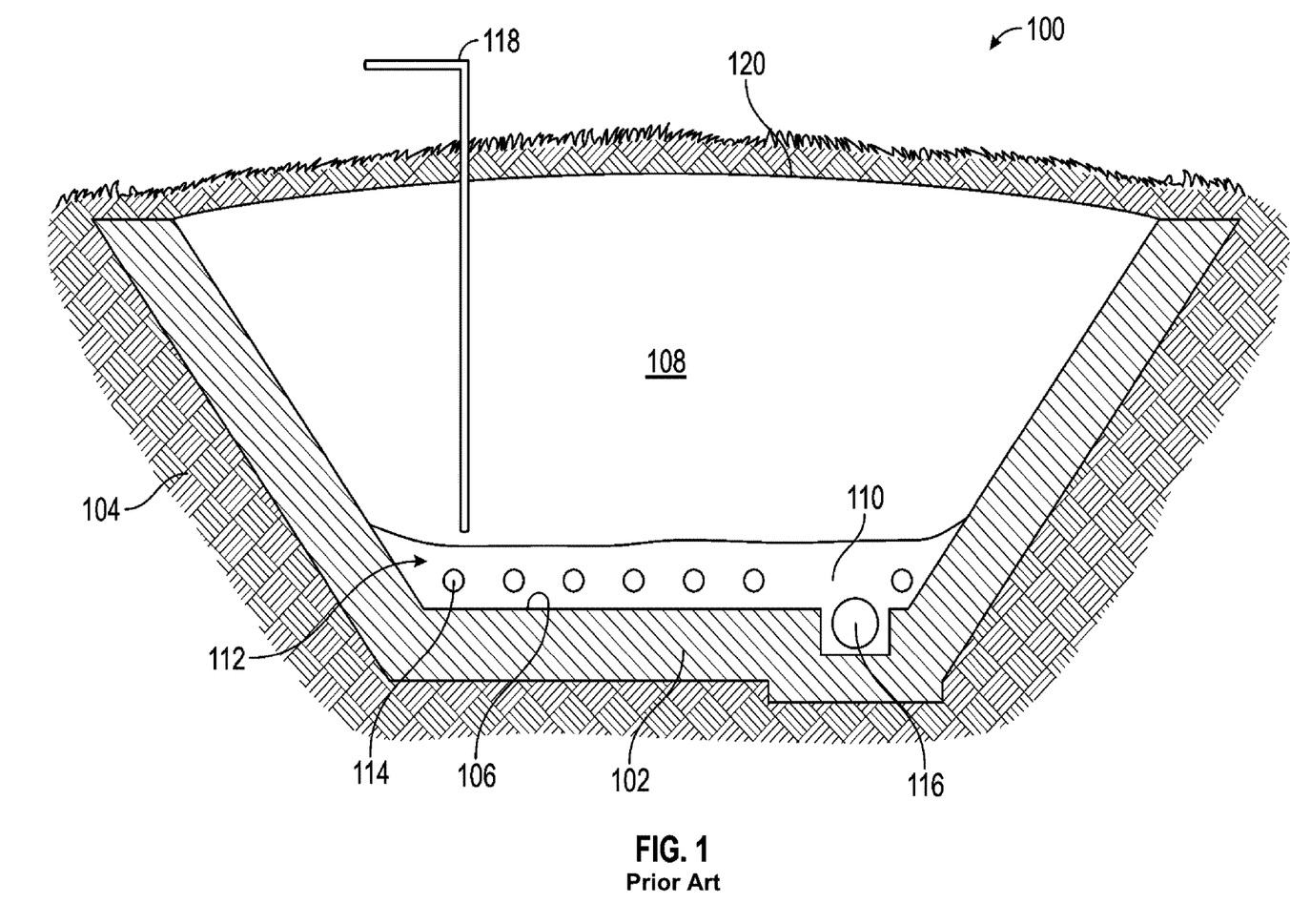
FIG. 1 illustrates a typical waste landfill to which the inventions described may be applied.

Turning now to a more detailed discussion of one or more possible embodiments utilizing aspects of the inventions disclosed and taught herein, FIG. 1 illustrates a cross sectional view of a typical, conventional waste landfill 100 comprising a containment system 102, such as, and solely as a non-limiting example, compacted low permeability clay, disposed within or on the ground 104, and a synthetic membrane liner 106. It is understood that the containment system 102, 106 is configured and used to retain the landfill waste 108, including leachate 110, and to prevent, if possible, leakage of waste 108, including leachate 110, into the adjacent ground 104. As illustrated, the bottom interior surface of the containment system 102 may comprise a leachate collection system 112 comprising collection pipes 114 and collection sump 116.

FIG. 1 also illustrates a gas, such as methane, extraction system 118 configured to remove gas generated by waste decomposition, and other landfill mechanism. It is known that to the extent the extracted gas has fuel value, such gas can be used, stored and/or sold. For example, extracted combustible gas can be used to provide electrical power for the leachate reduction systems described herein, or to provide thermal energy to the leachate to aid evaporation.

The landfill 100 illustrated in FIG. 1 is capped with clay or other suitable material and grass or other vegetation is allowed to grow over the enclosed waste. As discussed above, a variety of processes may be involved in the generation of liquid leachate 110, including, but not limited to, the seepage of rain, flood or other water into the landfill 100. Over the active life, the amount or volume of liquid leachate 110 typically will increase. To reduce the risk or amount of liquid leachate 110 that escapes containment, or simply to reduce the amount of leachate 110 in the landfill 100, leachate 110 may be periodically removed from the landfill 100 through the leachate collection system 112.

Figure 2:
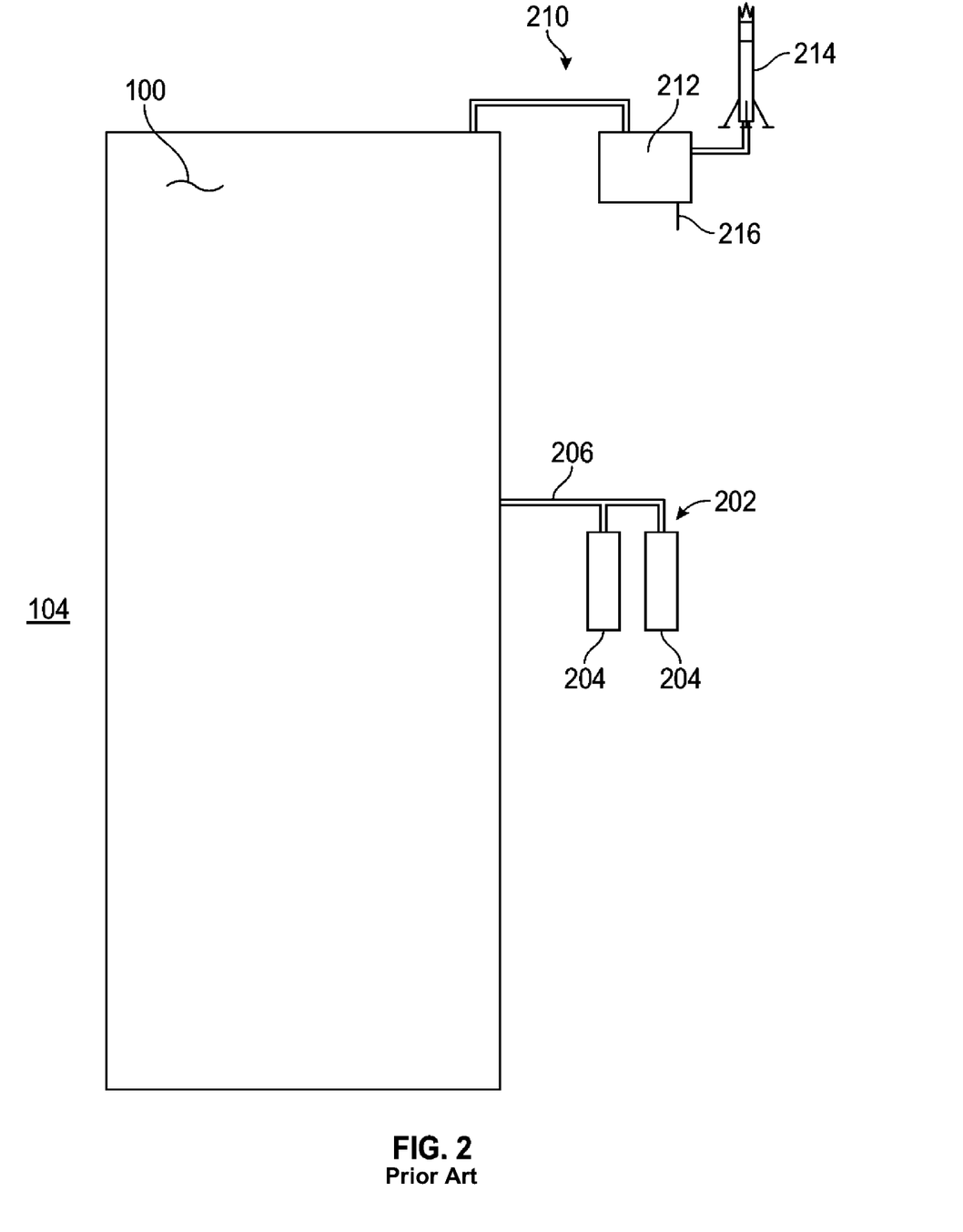
FIG. 2 illustrates another view of the waste landfill illustrated in FIG. 1.

FIG. 2 illustrates an overhead view of landfill 100 and adjacent equipment. A leachate removal system 202 is illustrated as comprising one or more storage tanks 204 and associated piping and pumping equipment 206. Also illustrated is a gas removal system 210 comprising a gas processing station 212 and a waste gas flare stack 214. Typically, gas removed from the landfill 100 by gas collection system 118 and gas extraction system 210 is minimally processed and burned in flare stack 214 or processed for resale or industrial use.

Figure 3A:
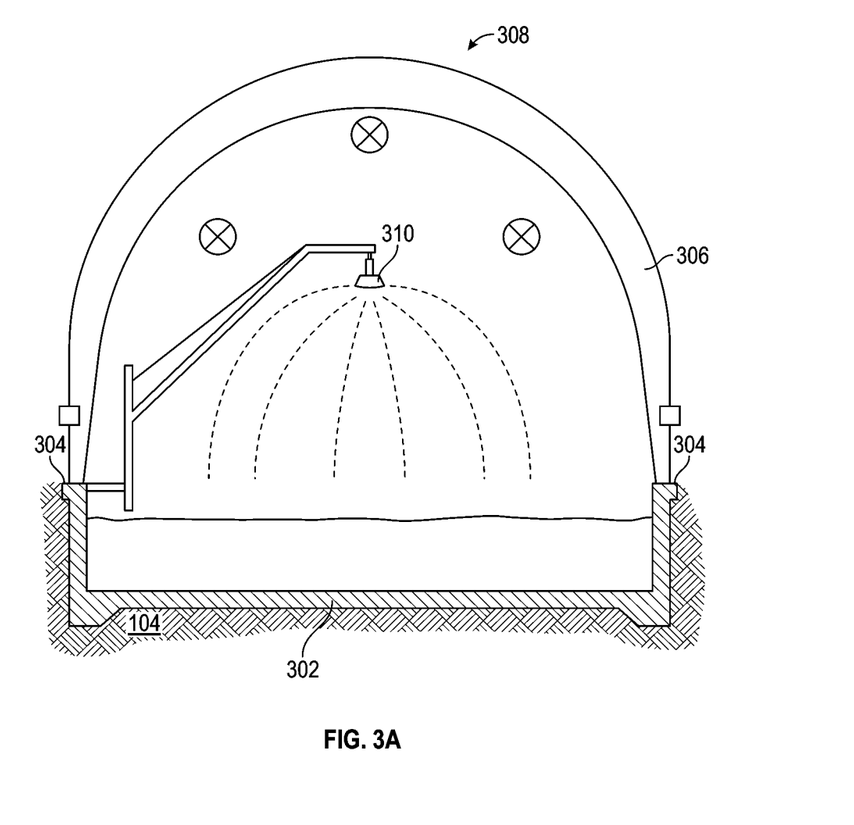
FIG. 3A illustrates one of many possible embodiments of a Leachate Removal System and Method, as described herein.
Figure 3B:
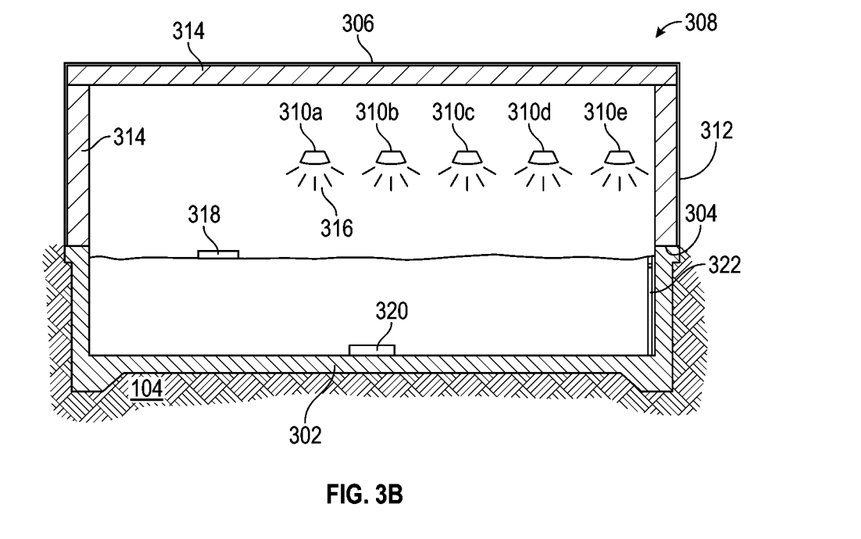
FIG. 3B illustrates a side view of the embodiment illustrated in FIG. 3A.

FIG. 3A and FIG. 3B illustrate an embodiment of the inventions disclosed herein and comprises a holding tank or vessel 302 configured to contain a predetermined volume of fluid, such as liquid leachate, and associated components. The vessel 302 is preferably rectangular, including square, but may be of any convenient shape suitable for purposes disclosed herein. The vessel 302 is illustrated as open at the upper surface 304. A containment system 306, such as a roof system, is coupled to the vessel 302 at the upper end 304 to form a leachate reduction enclosure 308. It is preferred that containment system be constructed from a material that allows solar radiation into the enclosure 308 to aid evaporation and other treatment processes. Lastly, a single spray head 310 is illustrated in FIG. 3A and a plurality of spray heads 310a-310d are illustrated in FIG. 3B.

FIG. 3A, which may be understood as an end view of the leachate reduction enclosure 308, illustrates a plurality of air movement devices 312. These air movement devices 312 may be located, for example, at one end of the enclosure 308. An opposite end may comprise one or a plurality of openings 314 to allow air in or out of the enclosure 308. Alternately or additionally, openings 314 may be located in a top portion of roof 306.

Liquid leachate 110 may be pumped from the leachate removal systems 202, or directly from the leachate collection system 112, to spray heads 310 for spraying the liquid leachate with the enclosure 308. It will be appreciated that the spray heads are designed to increase the surface area of the liquid leachate by producing leachate spray or droplets 316. A preferred form of spray head 310 is the Typhoon™ Evaporation head described on the www.nwci.com website and incorporated herein by reference. Other types and designs of liquid spray heads or atomizers may be used with equal or greater effect. Depending on the type of spray head 310 that is used, the leachate 110 may be filtered as necessary or desired to remove particulate matter that may clog the spray heads 310.

Air movement devices 312 may comprise ducted or non-ducted motorized fans, such as electric ducted fans. The air movement devices 312 may be configured to inject air into the enclosure 308 or to withdraw air from the enclosure. It is presently preferred that the air movement devices 312 be oriented to inject air into the enclosure 308 from one end at a volume and velocity such that the injected air will aid the evaporation of water from the leachate mist, and the humidified air will exit the enclosure 308 through the openings 314 without entraining liquid leachate, or with a minimum of entrained liquid leachate.

In an alternate embodiment, the air movers 312 are configured to remove air from the enclosure 308. It will be appreciated that in this embodiment, air enters the enclosure through the openings 314 and the humidified air is ejected through the fans 312.

In use, the air movers 312 cause a flow of air through the enclosure 308. Liquid leachate 110 is sprayed into this airstream through spray heads 310. The contact of this leachate mist and the injected air causes at least a portion of the water in the leachate to evaporate and thereby increase the humidity of the air travelling through the enclosure 308. The non-evaporated component of the leachate (which may be referred to as "concentrate") is allowed to fall into the vessel 302 for recirculation through spray heads 310. Materials, such as liquids, that are not evaporated will collect in the vessel 302 (such as on a geomembrane liner) where the leachate 110 will flow or be forced to a sump area. Recirculating pumps may be configured in known fashion to draw leachate 110 from the vessel 302 (e.g., a sump area) and return it to the spray heads 310.

This process may be continued until the liquid leachate in the vessel 302 reaches a predetermined concentration or weight (or some other concentrate property such as ammonia content), or until the amount of leachate in vessel 302 reaches a certain level, or some other predetermined criteria related to leachate reduction. FIG. 3B illustrates a leachate concentrate sensor 322, which may be a liquid level sensor; a fluid property sensor, such as a density meter; a thermometer; a specific gravity detector; or another sensor or transducer useful for determining one or more properties of the concentrate.

It is believed that the spraying or misting heads will provide significant dissolved oxygen to the leachate. However, additional aeration may be desired. To that end, as illustrated in FIG. 3B, but applicable to all embodiments of the invention, the enclosure 308 may comprise an aeration device 318 configured to increase the oxygen content of the concentrate in the vessel 302, such as by injecting ambient air into the concentrate. Increasing the amount of dissolved oxygen in the leachate concentrate may aid the oxidation of components in the concentrate and/or allow organisms to multiple and consume any organic food supply. The vessel 302 may also comprise a mixing device 320 configured to intermittently or continuously mix or agitate the leachate concentrate. For example, a suitable mixing device 320 may comprise one or more conventional electric sump or basement pumps configured to circulate the leachate in the vessel 302.

Figure 4:
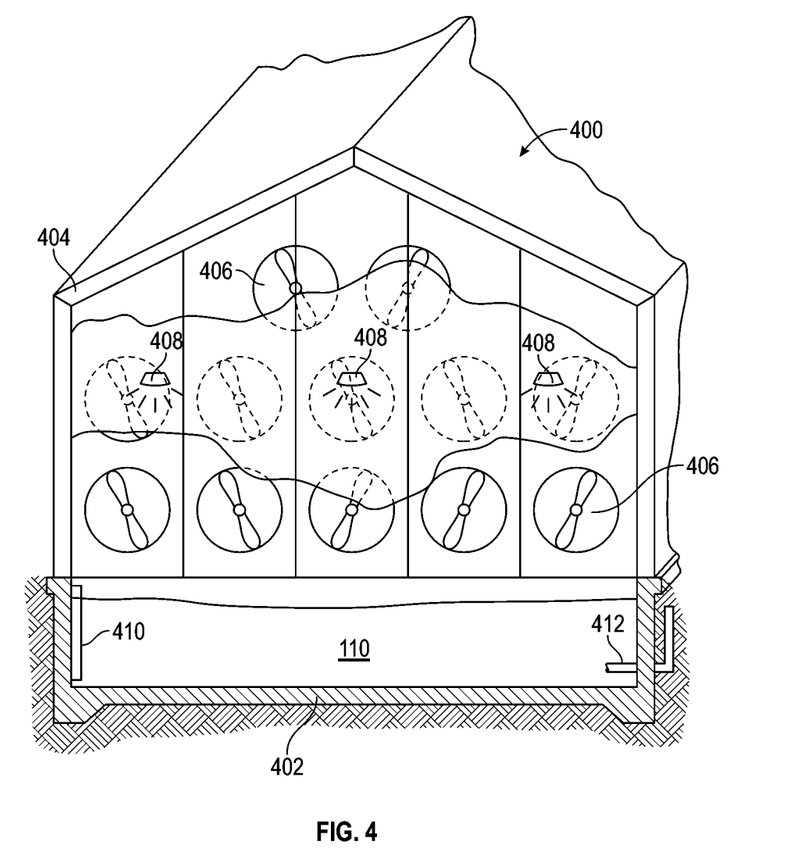
FIG. 4 illustrates a particular aspect of another embodiment of a Leachate Removal System and Method.

FIG. 4 illustrates one portion of a leachate removal enclosure 400 useful with the present inventions. Although this illustration represents a rectangular (including square) enclosure 400, the inventions are not limited to a particular shape of enclosure. One end 404 of the enclosure 400 may comprise a plurality of air movers 406. In this example, the air movers 406 are ducted electric fans configured to inject air into the enclosure 400. Also illustrated are spray heads 408, liquid level control 410 and leachate supply pipe 412.

It is preferred that the volumetric air flow rate and/or mass air flow rate through the enclosure 308, 400 is optimized to increase the rate of evaporation and yet not entrain liquid leachate in the air exhausted from the enclosure 308. For example, it is preferred, but not required, that the air exits (whether openings 314 or air movers 312) be equipped with humidity detectors and/or liquid detectors. The output from such detectors can be used to control the velocity or mass flow rate of the air exiting the enclosure 308 to avoid or minimize ejecting liquid leachate from the enclosure 308 into the environment. Additionally or alternately, demisting systems, such as demisting mats and surfaces can be used to "knock down" any entrained liquid water or leachate.

The openings 314 may have an adjustable size (for example manually zippered windows) to control the amount of ambient air allowed into or out of the enclosure 308, such as when ambient wind speeds and direction contribute to the airflow through the enclosure.

It will now be appreciated that the systems illustrated in FIGS. 3A, 3B and 4 can be run in batch mode or continuous mode, or both modes. For example, a predetermined amount of leachate 110 can be added to the enclosure (specifically, vessel 302, 402) and the leachate removal process run until the predetermined fluid property 322, such as liquid level, is reached. Alternately, the enclosure may be configured with a leachate level control system that allows additional leachate from the landfill 100 into the enclosure as the leachate level in the enclosure 308 drops because of successful evaporation of water from the leachate. Additionally, leachate 110 can be continually circulated between the landfill 100 and the leachate reduction enclosure 400, such as through supply pipe 412.

In one proposed embodiment, the vessel could be sized to provide approximately 350,000 gallons of leachate storage, and constructed from reinforced concrete lined with a 60-mil (0.060 inch) thickness geomembrane liner. The geomembrane liner would be secured to the concrete walls using, for example, an HDPE embedment strip.

A double-sided drainage geocomposite could be installed on the floor of the vessel below the geomembrane liner to serve as a leak-detection layer. Access to the leak detection layer may be provided by a vertical perforated standpipe at one end of the enclosure 308. The leak detection pipe may be monitored for the presence of leachate, and the liner repaired as needed.

It will be appreciated that the reactions, such as decomposition reactions, occurring in a waste landfill include exothermic reactions that raise the temperature of the liquid leachate. In another proposed embodiment, this natural thermal energy typically present in leachate as it exists in the landfill can be used to augment leachate reduction. The necessary piping and pumping equipment to move the warm leachate (i.e., about 80° F. to about 110° F.) from the landfill to the reduction system can be thermally insulated to lessen energy loss to the environment (i.e., cooling of the leachate), and the leachate reduction system can configured to continually circulate leachate between the landfill (where heating occurs) and the reduction system (where evaporation occurs). By limiting the amount of warm leachate cycled through the reduction system, the temperature of the leachate in the reduction system can be maximized (heat loss minimized) to augment evaporation. Alternately, a warm leachate-holding tank, preferably insulated, can be interposed between the landfill and the leachate reduction system, to supply the reduction system with a continual supply of warm leachate.

In another embodiment, recovered energy from the landfill, such as hydrocarbon gases can be used to heat the leachate (or concentrated leachate) in the leachate reduction system. For example, as mentioned above, hydrocarbon gas can be used to fuel a pass-through fluid heater, such as those available from Parker Boiler. Alternately, recovered hydrocarbon gases can be used to fuel an internal combustion engine/electrical generator set to energized electric heating of the leachate. Still further, waste heat from the flue stack 214 illustrated in FIG. 2 can be captured, such as by heater tubes transporting a working fluid and the heated working fluid used to heat the leachate. In certain embodiments, the leachate can be the working fluid, but scaling or other fouling of the heater tubes may adversely occur.

It is preferred, but not required that a given landfill have a plurality of leachate removal enclosures, such as, for example two. By having more than one leachate removal enclosure, at least one system can be operational at all times. This allows for the periodic shut down of the other enclosure for maintenance, such as, but not limited to, removal of the concentrated leachate liquids and/or solids.

In a preferred embodiment, a combined leachate flow rate to the spray heads, or individual spray head flow rates, fan speed and/or exit size are determined as a function of, for example, ambient wind speed outside of the enclosure; the velocity or mass flow rate of air within the enclosure; the relative humidity, and temperature of the ambient air and the enclosure air; and temperature of the leachate. This data can be used to control the fans speed, rotation speed of the spray heads, and pressurization of the leachate supplied to the spray heads and/or the size of the air exits. For example, humidity detectors at the enclosure exits can be used to control one or more of the operational characteristics leachate removal system so the air exiting the enclosure is maintained below the ambient air dew point.

It will be appreciated that operation of the leachate removal system may be automated based on one or more of the parameters discussed previously. For example, and without limitation, a programmable logic controller, an application specific semiconductor, or other logic device can be configured to operate and control the system as described to remove water from the leachate and thereby reduce the volume of leachate associated with the landfill. With an automated or controlled systems, as the ambient environmental conditions change with the seasons or within a day, the operational characteristics of the systems (such as fan speeds and flow rates) will be adjusted accordingly.

Figure 5:
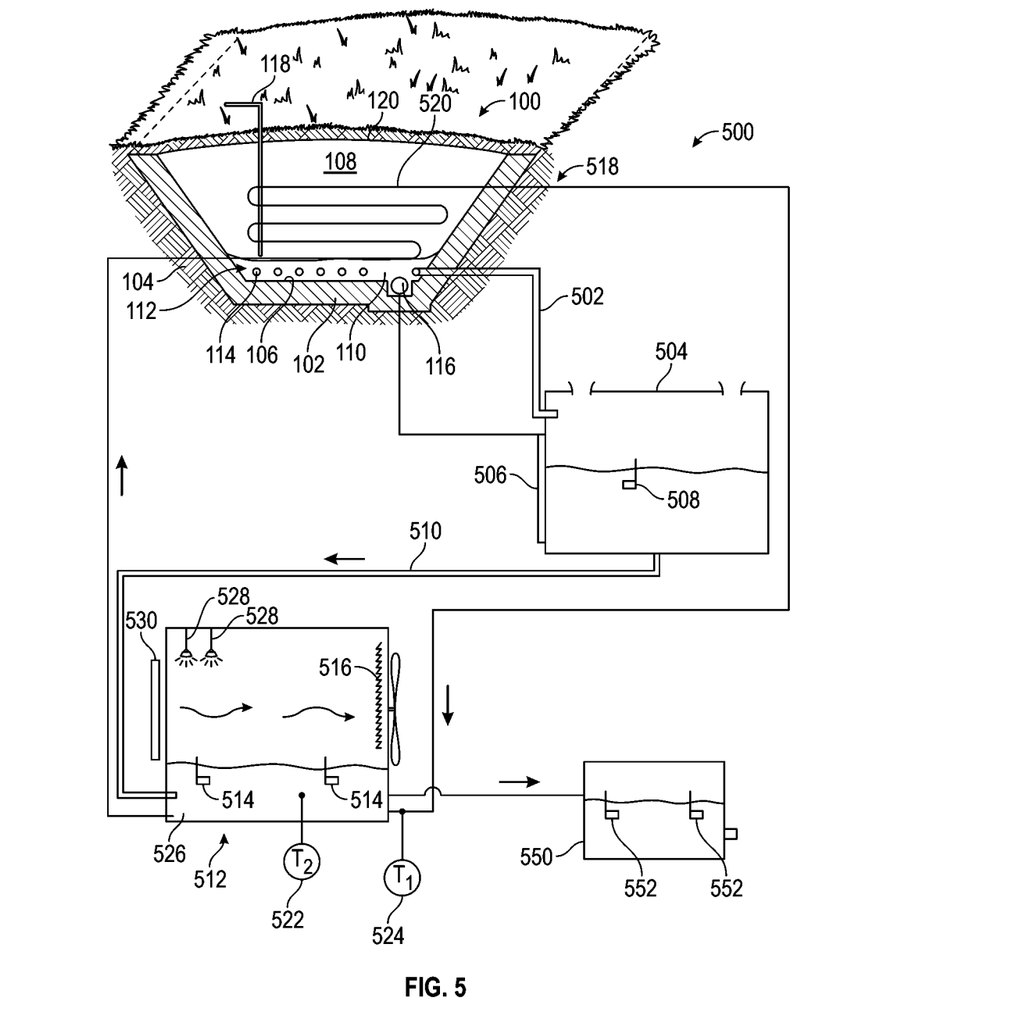
FIG. 5 illustrates another embodiment of a Leachate Treatment System and Method.

FIG. 5 illustrates one of many possible embodiments of a leachate treatment and removal system 500 utilizing aspects of the inventions disclosed herein. As described with reference to FIG. 1, a typical or conventional waste landfill 100 comprises a leachate collection system 112 comprising collection pipes 114 and collection sump 116. The landfill 100 may also comprise a gas collection/extraction system 118 configured to remove gas generated by waste decomposition, and other landfill mechanisms.

The leachate collection system 112 may be plumbed by conventional means 502 to a first or collection tank 504 for collecting or storing leachate removed from landfill 100. It will be appreciated that plumbing 502 may be by means of gravity feed from the landfill 100 to the first tank 504, or may comprise one or more pumps or other fluid movers. The tank 504, if used, may comprise a liquid level transducer or indicator 506 configured to control the amount of leachate allowed into the tank 504. For example, and not limitation, the level transducer can be configured to control a valve or pump, such as collection sump 116. Manual control of the tank level is also suitable.

It will be appreciated that the leachate collected in tank 504 may comprise a variety of liquids and substances, including hydrocarbon-based oils and fuels. Lower density fluids will float to the top of the leachate where there are preferably, but not necessarily, skimmed off or otherwise removed from the leachate. Oil absorbent socks and booms are particularly suitable for this application, and may be disposed of after use in the landfill or otherwise. If desired, tank 504 utilizes one or more aerators, air diffusers or micro bubblers 508 configured to increase the dissolved oxygen in the leachate to promote aerobic bacterial decomposition. Dryden Aqua supplies air diffusers suitable for this purpose. However, such aeration may interfere with or diminish the density separation of fluids necessary for skimming off undesirable constituents. In a preferred embodiment, first tank 504 is a "settling" tank and little to no aeration or leachate mixing is done. Tank 504 may be insulated to minimize heat loss from the leachate, if desired.

Once the leachate in tank 504 has been treated (such as by aeration, by skimming or both) all or a portion of the leachate is transferred, such as by conventional plumbing 510, to an evaporation/aeration system 512. Evaporation/aeration system 512 may comprise the cross-flow systems illustrated and described with respect to FIG. 3A, 3B or 4. It is also preferred, but not required, that the roof of the evaporation/aeration system 512 be transmissive to solar radiation to aid in the heating of the leachate, evaporation of water and/or stripping of ammonia.

In addition to the components and functionality of any of those systems previously described, system 512 may comprise an aeration system 514 configured to increase the aerobic bacterial or biological action in the system 512. In addition, aeration tends to increase the pH of the leachate, which in turn aids in ammonia stripping. As required, system 512 may comprise one or more demisting mats 516 to remove liquid entrained or carried by the air passing through the system 512. If rotating spray heads are used, such as those available from Typhoon, the rate of head rotation can be adjusted, such as by a variable frequency drive, to effect the amount of water entrained by the cross-flowing air.

In the event a first or settling tank 504 is not utilized oil absorbent socks or booms may be used in the evaporation/aeration system 512. Further, and as may be desired, one or more submersible pumps may be used to recirculate or mix the leachate in evaporation/aeration system 512. If used, it is preferred that leachate near the fluid surface is recirculated to not disturb material that has settled to the bottom of the tank 526.

Preferably, but not necessarily, system 512 comprises a leachate heating system 518 configured to selectively heat or maintain a temperature of the leachate conducive to aerobic bacterial action and/or ammonia stripping. For example and not limitation, heating system 518 may comprise a piping based heat exchanger 520 buried within the landfill 100 and configured to transfer heat from the landfill to the leachate flowing through the buried piping. It is believe that HDPE piping or tubing is suitable as a buried heat exchanger 520. Using this type of heating system, a combination of piping, pumps and coarse filters can be plumbed to circulate a portion of the leachate in system 512 through heat exchanger 520 and back to system 512. It is desired, but not required, to utilize temperature transducers or indicators 522 and 524 to determine whether the "heated" leachate returning from the landfill 100 is sufficiently heated to be added back into system 512. For example, during summer months, the returning fluid may not be sufficiently heated and adding returning leachate to system 512 may effect a cooling of the leachate in the system. The temperatures or temperature differential may be used to control one or more pumps or valves in heating system 518. Alternately, leachate may be heated by other means, such as by using combustible gas extracted from the landfill 100 or purchased on the market in a direct-fired boiler, or using electricity in a fluid heater.

As described previously for FIGS. 3A, 3B and 4, leachate is circulated from the tank portion 526 of the system 512 through one or more spray or misting heads 528 to effect evaporation of at least a portion of the water in the leachate into the air drawn through or blown into system 512. It will also be appreciated that ammonia (NH3) may be stripped from the sprayed or misted leachate by the moving air and returned to the ambient environment outside of the system 512, as may be allowed from jurisdiction to jurisdiction.

To aid the ammonia stripping, the air entering the system 512 may be heated or the air temperature otherwise controlled during all or a portion of the system's 500 operation. For example and not limitation, an air-to-fluid heat exchanger 530 may be configured to selectively heat the ambient air drawn or pushed into system 512. In a preferred embodiment, a portion of the leachate heated by system 518 may be used to transfer heat to the air used to strip ammonia within the system 512 and/or to evaporate water. Other means and sources of heat energy may be used as desired to heat or preheat ambient air.

It is desired that the leachate in system 512, specifically the leachate in the tank portion 526, be sampled continuously or periodically to determine one or more fluid properties, such as but not limited to, pH, ammonia content, bacterial activity, dissolved oxygen, chemical oxygen demand and/or bacterial oxygen demand. Once the leachate in system 512 reaches, attains or exceeds one or more fluid property targets, leachate may be removed from the system 512 and transferred to a holding tank 550 for additional processing. For example, and not limitation, a conventional 20,000-gallon frac tank is suitable for use as tank 550. Tank 550 preferably comprises one or more aerators 552 to increase the available oxygen in the leachate for bacterial activity and to promote additional ammonia stripping. Although not required, it may be desired to insulate all or a portion of the tank 550 to minimize heat loss by the leachate to the environment. In a preferred system 500, leachate in tank 550 is sampled continuously or periodically to determine one or more fluid properties, such as but not limited to, pH, ammonia content, bacterial activity, dissolved oxygen, chemical oxygen demand and/or bacterial oxygen demand. For example, once the ammonia concentration in the leachate reaches an acceptable level, leachate from the tank 550 may be discharged to a conventional waste treatment facility. For example, it is not uncommon for a waste treatment facility to place limits on the amount of ammonia it will accept in a given period, e.g., 45 lbs per day. By reducing the ammonia content and water content of the leachate, more leachate can be disposed of.

A leachate treatment and removal system similar to that described with respect to FIG. 5 has been operated as described above with the following operational characteristics determined over an operational period of about 6 weeks. The system did not, however, utilize a leachate heating system or an ambient air heating system. Increased operation performance is expected if leachate heating and/or ambient air heating is utilized.

| Property | Settling Tank | Evaporation/Stripping System | Holding Tank |
| --- | --- | --- | --- |
| Ammonia | 1,200 mg/L | 915 mg/L | 888 mg/L |
| Chemical Oxygen Demand | 8,460 mg/L | 12,800 mg/L | 6,870 mg/L |
| Biological Oxygen Demand | 1,550 mg/L | 853 mg/L | 306 mg/L |

| Property | Settling Tank | Evaporation/Stripping System | Holding Tank |
| --- | --- | --- | --- |
| Ammonia | 1,270 mg/L | 625 mg/L | 562 mg/L |
| Chemical Oxygen Demand | 4,780 mg/L | 2,590 mg/L | 5,080 mg/L |
| Biological Oxygen Demand | 1,930 mg/L | 237 mg/L | 105 mg/L |

| Property | Settling Tank | Evaporation/Stripping System | Holding Tank |
| --- | --- | --- | --- |
| Ammonia | 1,070 mg/L | 515 mg/L | 112 mg/L |
| Chemical Oxygen Demand | 6,030 mg/L | 2,830 mg/L | 2,760 mg/L |
| Biological Oxygen Demand | 2,520 mg/L | Non-detected | Non-detected |

As can be seen from these results, the evaporation/stripping system can be expected to decrease the ammonia content of the leachate by between about 23% and about 52%. The holding tank can be expected to further decrease the ammonia content of the leachate leaving the evaporation/stripping system by between about 3% and about 78%. Overall, this system is seen to reduce the ammonia content of the landfill leachate by between about 26% and about 90%. In addition to ammonia stripping, the system was able to reduce the volume of leachate by about 7 to about 10% through water evaporation and ammonia loss.

Thus, the systems described herein, such as system 500, may be configured to treat and reduce the amount of leachate generated by a landfill 100 without the use of or with minimal use of expensive chemicals and processes.

Other and further embodiments utilizing one or more aspects of the inventions described above can be devised without departing from the spirit of Applicant's invention. For example, rather than automated control, a system devised according to these inventions, can controlled manually. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A leachate processing system, comprising
   an enclosure comprising a vessel portion configured to hold liquid leachate;
   an air movement system operatively coupled to the enclosure and configured to cause a flow of outside ambient air into and out of the enclosure;
   a plurality of leachate spray heads disposed within the enclosure and oriented such that leachate droplets sprayed from the heads fall within the enclosure through the air flow and into the vessel portion;
   at least a portion of the enclosure allows solar radiation to pass through and into the enclosure;
   an aeration system configured to increase the available oxygen in the liquid leachate in the vessel; and
   a control system operatively coupled to at least the air movement system or the plurality of spray heads and configured to permit adjustment of the amount of liquid entrained in the air exiting the enclosure.

2. The system of claim 1, wherein leachate droplet size is optimized for ammonia stripping.

3. The system of claim 1, wherein operation of the plurality of spray heads are optimized for ammonia stripping.

4. The system of claim 1, wherein leachate droplet size is optimized for water evaporation.

5. The system of claim 1, wherein operation of the plurality of spray heads are optimized for water evaporation.

6. The system of claim 1, further comprising a submersible pump configured to draw from an upper portion of the leachate in the vessel portion and to recirculate the leachate within the vessel portion.

7. The system of claim 1, further comprising a leachate heating system configured to increase or maintain a temperature of the leachate in the vessel portion.

8. The system of claim 7, wherein the leachate heating system comprises a heat exchange structure buried within a waste landfill and configured to transfer heat from the landfill to leachate from the vessel portion flowing through the heat exchange structure.

9. The system of claim 1, further comprising an ambient air heating system configured to increase or maintain a temperature of the ambient air flowing into the enclosure.

10. The system of claim 9, wherein the ambient air heating system comprises a heat exchange structure buried within a waste landfill and configured to transfer heat from the landfill to leachate from the vessel portion flowing through the heat exchange structure.

11. A system for processing leachate, comprising
    a vessel configured to hold liquid leachate;
    a structure at least partially enclosing the vessel, and at least a portion of which allows solar radiation to pass there through;
    an air movement system configured to cause a flow of ambient air into and out of the structure;
    a plurality of spray heads disposed above the vessel and oriented such that leachate spray falls through the air flow within the structure;
    an aeration system configured to increase the available oxygen in the liquid leachate in the vessel; and
    a control system operatively coupled to at least the air movement system or the plurality of spray heads and configured to permit adjustment of an amount of liquid entrained in air exiting the structure.

12. The system of claim 11, wherein the control system is configured to adjust the spray heads and/or the air movement system to maximize an amount of ammonia stripped from the sprayed leachate.

13. The system of claim 11, wherein the control system is configured to adjust the spray heads and/or air movement system to maximize an amount of water removed from the sprayed leachate.

14. The system of claim 11, further comprising a pump configured to recirculate the leachate within the vessel.

15. The system of claim 11, further comprising a leachate heating system configured to increase or maintain a temperature of the leachate in the vessel.

16. The system of claim 15, wherein the leachate heating system comprises a heat exchanger configured to transfer heat from a landfill to leachate in the vessel.

17. The system of claim 11, further comprising an ambient air heating system configured to increase or maintain a temperature of ambient air flowing into the structure.

18. The system of claim 17, wherein the ambient air heating system comprises a heat exchanger configured to transfer heat from a landfill to ambient air entering the structure.

19. The system of claim 16, wherein the control system is configured to adjust the spray heads, the air movement system, and/or a temperature of the leachate to maximize an amount of ammonia stripped from the sprayed leachate.

20. The system of claim 11, wherein the control system is configured to adjust the spray heads, the air movement system, and/or a temperature of the ambient air to maximize an amount of water removed from the sprayed leachate.

* * * * *